(12) United States Patent
Kotha et al.

(10) Patent No.: US 11,959,791 B2
(45) Date of Patent: Apr. 16, 2024

(54) SYSTEMS AND METHODS FOR SMART POINT LEVEL SENSING OF WASTE TANK

(71) Applicant: B/E AEROSPACE, INC., Winston Salem, NC (US)

(72) Inventors: Maanas Kumar Kotha, Hyderabad (IN); Nirmala Kanta Sahoo, Bangalore (IN); Shivashankar Maddanimath Veerayya, Bangalore (IN); Krunal Kartikbhai Dhonde, Vapi (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 3 days.

(21) Appl. No.: 17/857,767

(22) Filed: Jul. 5, 2022

(65) Prior Publication Data

US 2023/0184577 A1 Jun. 15, 2023

(30) Foreign Application Priority Data

Dec. 9, 2021 (IN) .............................. 202141057338

(51) Int. Cl.
*G01F 23/296* (2022.01)
*G01F 23/20* (2006.01)
*G06F 11/30* (2006.01)

(52) U.S. Cl.
CPC ............ *G01F 23/296* (2013.01); *G01F 23/20* (2013.01); *G06F 11/3013* (2013.01); *G06F 11/3089* (2013.01)

(58) Field of Classification Search
CPC ...... G01F 23/296; G01F 23/20; G01F 23/205; G01F 23/0007; G01F 25/20; G06F 11/3013; G06F 11/3089
See application file for complete search history.

(56) References Cited

U.S. PATENT DOCUMENTS

| | | | |
|---|---|---|---|
| 5,015,995 A | * | 5/1991 | Holroyd .............. G01F 23/2965 367/908 |
| 5,035,140 A | | 7/1991 | Daniels et al. |
| 5,604,938 A | | 2/1997 | Tyler |
| 5,850,757 A | | 12/1998 | Wierenga |

(Continued)

FOREIGN PATENT DOCUMENTS

| | | |
|---|---|---|
| WO | 0206594 | 1/2002 |
| WO | 2016160954 | 10/2016 |
| WO | 2021094550 | 5/2021 |

OTHER PUBLICATIONS

European Patent Office, European Search Report dated May 2, 2023 in Application No. 22211234.4.

*Primary Examiner* — Tarun Sinha
(74) *Attorney, Agent, or Firm* — SNELL & WILMER L.L.P.

(57) ABSTRACT

A triple authentication waste level monitoring system for an aircraft includes a point level sensor for monitoring a wastewater level within a waste tank, a load cell for measuring a weight of the waste tank, and a flush counter for counting a number of toilet flushes since a previous service to the waste tank. A controller receives data from these three sensors and determines whether the waste tank is at capacity. The controller can determine waste tank capacity whether or not the point level sensor is faulty and compares the sensor data with various thresholds to ensure accuracy of the waste tank fluid level determination.

17 Claims, 4 Drawing Sheets

(56) References Cited

U.S. PATENT DOCUMENTS

| | | |
|---|---|---|
| 6,227,490 B1 | 5/2001 | Marcellus |
| 10,208,468 B2 | 2/2019 | Hardwick et al. |
| 10,385,559 B2 | 8/2019 | Canfield et al. |
| 10,822,784 B2 | 11/2020 | Schomburg et al. |
| 10,942,056 B2 | 3/2021 | Hoang et al. |
| 2018/0364088 A1* | 12/2018 | Philipp ................ B60K 15/061 |
| 2020/0264028 A1* | 8/2020 | Hoang ................... G01F 23/80 |

* cited by examiner

SYSTEMS AND METHODS FOR SMART POINT LEVEL SENSING OF WASTE TANK

CROSS-REFERENCE TO RELATED APPLICATIONS

This application claims priority to, and the benefit of, India Patent Application No. 202141057338, filed Dec. 9, 2021 (DAS Code 8C3F) and titled "SYSTEMS AND METHODS FOR SMART POINT LEVEL SENSING OF WASTE TANK," which is incorporated by reference herein in its entirety for all purposes.

FIELD

The present disclosure relates to drain systems and methods for improved waste level and overflow detection and, more particularly, improved wastewater overflow detection systems and methods for use in aircraft lavatories.

BACKGROUND

Accurately detecting the quantity of a liquid waste within a waste tank is a challenge within the industry. Challenges arise primarily due to the variances of different types of media present in a waste tank including but not limited to dense or fluffy waste paper, air bubbles, human waste of different densities, soap foams, coffee grounds, leftover food, etc. An inaccurate measurement of a waste tank level may lead to false positive indications as well as an unsanitary or dangerous leakage situation. A standard aircraft waste tank may be limited to two invasive sensors. This limitation may ensure safety against additional opportunity for a fluid leak.

SUMMARY

A waste level monitoring system for an aircraft waste tank is disclosed herein, comprising a point level sensor disposed on the aircraft waste tank, a load cell disposed on the aircraft waste tank, a flush counter configured to count a number of toilet flushes since a previous service to the aircraft waste tank, and a controller electronically coupled to the point level sensor, the load cell, and the flush counter. The controller is configured to receive, via the point level sensor, a first signal indicating a level of waste within the aircraft waste tank, receive, via the load cell, a second signal indicating a weight of the aircraft waste tank, receive, via the flush counter, a third signal indicating the number of toilet flushes since the previous service to the aircraft waste tank, and determine whether the point level sensor is faulted. In response to the point level sensor being faulted, the controller is configured to determine whether (a) the weight of the aircraft waste tank is between a minimum weight threshold and a maximum weight threshold and (b) the number of toilet flushes is greater than a minimum flush threshold. In response to both (a) and (b) being true, the controller is configured to send a waste system status signal to a display device onboard an aircraft indicating that the aircraft waste tank is full.

In various embodiments, in response to the point level sensor not being faulted, the controller is configured to determine whether (a) the weight of the aircraft waste tank is between the minimum weight threshold and the maximum weight threshold, (b) the number of toilet flushes is greater than the minimum flush threshold, and (c) the first signal indicates that the aircraft waste tank is full. In response to (a), (b), and (c) being true, the controller is configured to send the waste system status signal to the display device onboard the aircraft indicating that the aircraft waste tank is full.

In various embodiments, in response to at least one of (a) or (b) being false, the controller is configured to proceed with a flush cycle and increment the number of toilet flushes.

In various embodiments, in response to at least one of (a), (b), or (c) being false, the controller is configured to proceed with a flush cycle and increment the number of toilet flushes.

In various embodiments, the waste level monitoring system further comprises the display device.

In various embodiments, the point level sensor is an ultrasonic point level sensor.

A method for monitoring a level of waste within a waste tank is disclosed. The method comprises receiving, by a controller, a first signal from a point level sensor indicating the level of waste within the waste tank, receiving, by the controller, a second signal from a load cell indicating a weight of the aircraft waste tank, receiving, by the controller, a third signal from a flush counter indicating a number of toilet flushes since a previous service to the aircraft waste tank, and determining, by the controller, whether the point level sensor is faulted. In response to determining that the point level sensor is faulted, the controller is configured to determine whether (a) the weight of the aircraft waste tank is between a minimum weight threshold and a maximum weight threshold and (b) the number of toilet flushes is greater than a minimum flush threshold. In response to both (a) and (b) being true, the controller is configured to send a waste system status signal to a display device onboard an aircraft indicating that the aircraft waste tank is full.

In various embodiments, the method further comprises, in response to the point level sensor not being faulted, determining, by the controller, whether (a) the weight of the aircraft waste tank is between the minimum weight threshold and the maximum weight threshold, (b) the number of toilet flushes is greater than the minimum flush threshold, and (c) the first signal indicates that the aircraft waste tank is full. The method further comprises, in response to (a), (b), and (c) being true, sending, by the controller, the waste system status signal to the display device onboard the aircraft indicating that the aircraft waste tank is full.

In response to at least one of (a) or (b) being false, the controller is configured to proceed with a flush cycle and increment the number of toilet flushes.

In response to at least one of (a), (b), or (c) being false, the controller is configured to proceed with a flush cycle and increment the number of toilet flushes.

In various embodiments, the method further comprises computing, by the controller, a number of successful flush cycles needed to reach the maximum capacity of the waste tank.

In various embodiments, the method further comprises determining, by the controller, whether the waste tank has undergone maintenance, and in response to the waste tank having undergone maintenance, resetting, by the controller, the number of toilet flushes since the previous service to the aircraft waste tank to zero.

In various embodiments, the method further comprises computing, by the controller, at least one of the minimum weight threshold, the maximum weight threshold, and the minimum flush threshold.

In various embodiments, the method further comprises determining whether the point level sensor is faulted includes validation of a discrete input received from the point level sensor which indicates the state of the point level sensor.

An aircraft is disclosed, comprising a toilet disposed in a lavatory, a waste tank, a fluid conduit extending from the toilet to the waste tank, a point level sensor disposed in the waste tank, the point level sensor configured to measure a wastewater level within the waste tank, a load cell coupled to the aircraft waste tank, a flush counter configured to count a number of toilet flushes since a previous service to the waste tank, and a controller electronically coupled to the point level sensor, the load cell, and the flush counter. The controller is configured to receive, via the point level sensor, a first signal indicating a level of waste within the waste tank, receive, via the load cell, a second signal indicating a weight of the aircraft waste tank, receive, via the flush counter, a third signal indicating the number of toilet flushes since the previous service to the aircraft waste tank, and determine whether the point level sensor is faulted. In response to the point level sensor being faulted, the controller is configured to determine whether (a) the weight of the aircraft waste tank is between a minimum weight threshold and a maximum weight threshold, and (b) the number of toilet flushes is greater than a minimum flush threshold. In response to both (a) and (b) being true, the controller is configured to send a waste system status signal to a display device onboard an aircraft indicating that the aircraft waste tank is full.

In various embodiments, in response to at least one of (a) or (b) being false, the controller is configured to proceed with a flush cycle and increment the number of toilet flushes.

In various embodiments, in response to the point level sensor not being faulted, the controller is configured to determine whether (a) the weight of the aircraft waste tank is between the minimum weight threshold and the maximum weight threshold, (b) the number of toilet flushes is greater than the minimum flush threshold, and (c) the first signal indicates that the aircraft waste tank is full. In response to (a), (b), and (c) being true, the controller is configured to send the waste system status signal to the display device onboard the aircraft indicating that the aircraft waste tank is full.

In various embodiments, in response to at least one of (a), (b), or (c) being false, the controller is configured to proceed with a flush cycle and increment the number of toilet flushes.

In various embodiments, the waste level monitoring system further comprises the display device.

In various embodiments, the point level sensor is an ultrasonic point level sensor.

The foregoing features and elements may be combined in various combinations without exclusivity, unless expressly indicated herein otherwise. These features and elements as well as the operation of the disclosed embodiments will become more apparent considering the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

Figure 1:
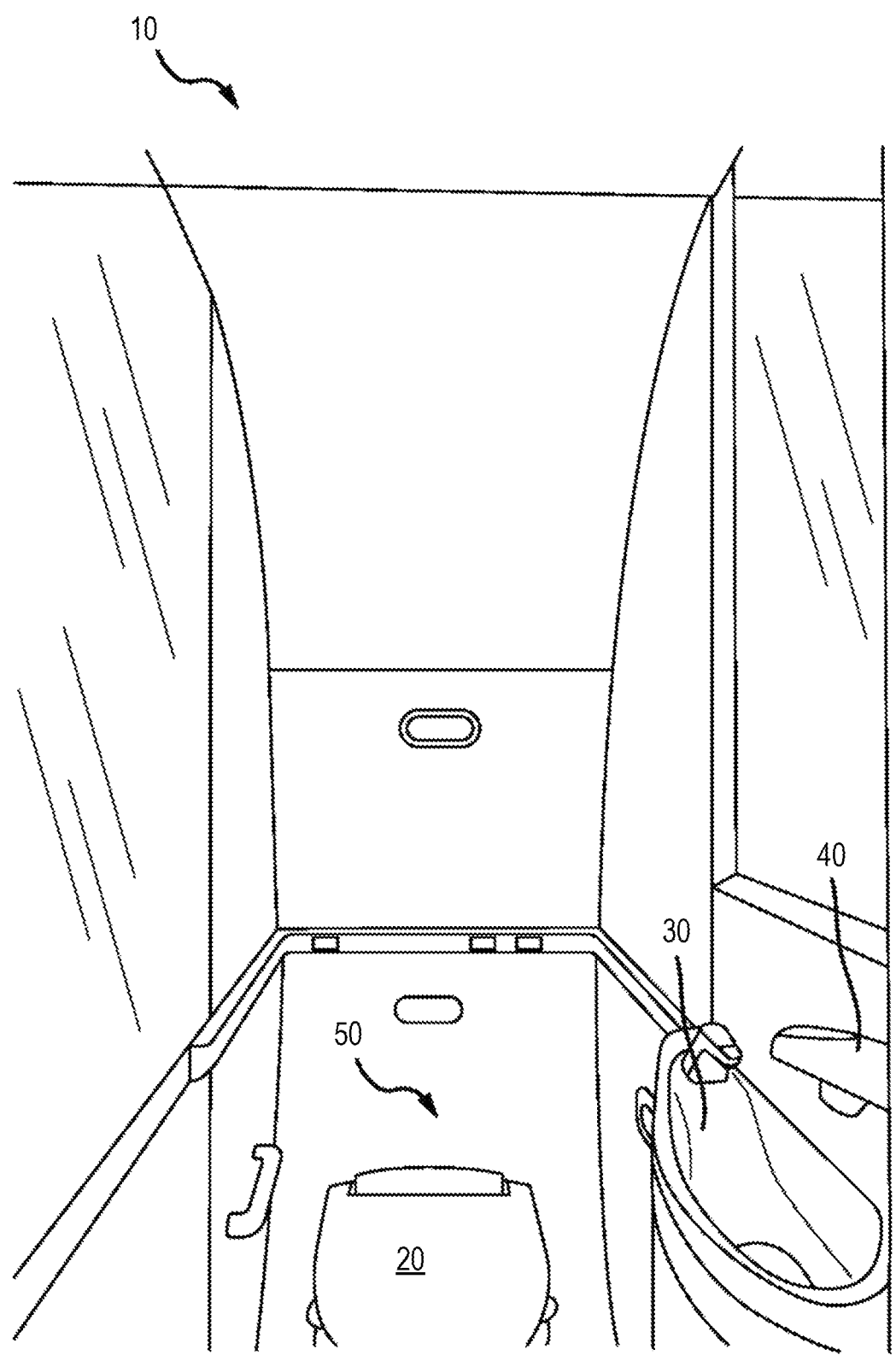
FIG. 1 illustrates a perspective view of a lavatory for an aircraft, in accordance with various embodiments.

The detailed description of exemplary embodiments herein refers to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Point Level Sensors (PLS) are mounted on vacuum waste collection tanks to detect the level of waste (sewage) inside the tank and communicate the same to the cabin crew to decide further usability of the lavatory. Ultrasonic technology detects a wet/dry condition when media is in close proximity to the bottom of the sensor face (e.g., within 1 inch from the bottom of sensor face). It is typically desirable that the criteria for generating a DRY or WET signal be met for a predetermined continuous duration, such as 15-30 seconds continuously.

Ultrasonic PLSs tend to generate erroneous FULL/WET status even when waste tank is not full due to the accumulated solid debris in between the prongs of the sensor. For example, when an aircraft climbs, there is a possibility of debris being stuck between two prongs of the ultrasonic PLS which accounts for erroneous readings for the waste tank. Due to the erroneous FULL/WET status from the PLS, crew members may be alerted for a full waste tank. This tends to unnecessarily prohibit further use of the lavatory since the sensor is generating erroneous output.

Disclosed herein are triple authentication systems and algorithms to determine usability of a lavatory. In contrast to legacy systems, which typically only considering PLS status to determine usability of lavatories, systems, apparatus, and methods of the present disclosure, considers real time weight of the waste tank, a counter value maintained by a controller and associated hardware, as well as with the PLS status for more accurate and reliable operation.

A triple authentication waste level monitoring system of the present disclosure may prevent unnecessary restrictions on lavatory usage when the vacuum waste collection tank is not full. A triple authentication waste level monitoring system of the present disclosure may prevent unnecessary flooding of a lavatory floor when a vacuum waste collection tank is full. A triple authentication waste level monitoring system of the present disclosure may reduce the non-operability of lavatories by 80-90% when they are not full. A triple authentication waste level monitoring system of the present disclosure may ensure that flooding of a lavatory does not occur during a flight operation, which may result in less downtime on the usage of an aircraft lavatory and more reliable information to the crew allowing the crew to focus on other priority activities.

Referring now to FIG. 1, a perspective view of a lavatory 10 of an aircraft is illustrated in accordance with various embodiments. The lavatory 10 comprises a toilet 20, a water basin 30 (e.g., a sink), and a faucet 40. In various embodiments, the lavatory 10 further comprises a plumbing system 50. The plumbing system 50 is in fluid communication with the toilet 20, the water basin 30, and the faucet 40. In this regard, in response to flushing the toilet 20, wastewater may be transferred throughout the plumbing system 50 as described further herein. Similarly, in response to running water via the faucet 40, wastewater may be transferred throughout the plumbing system 50 as described further herein.

Figure 2:
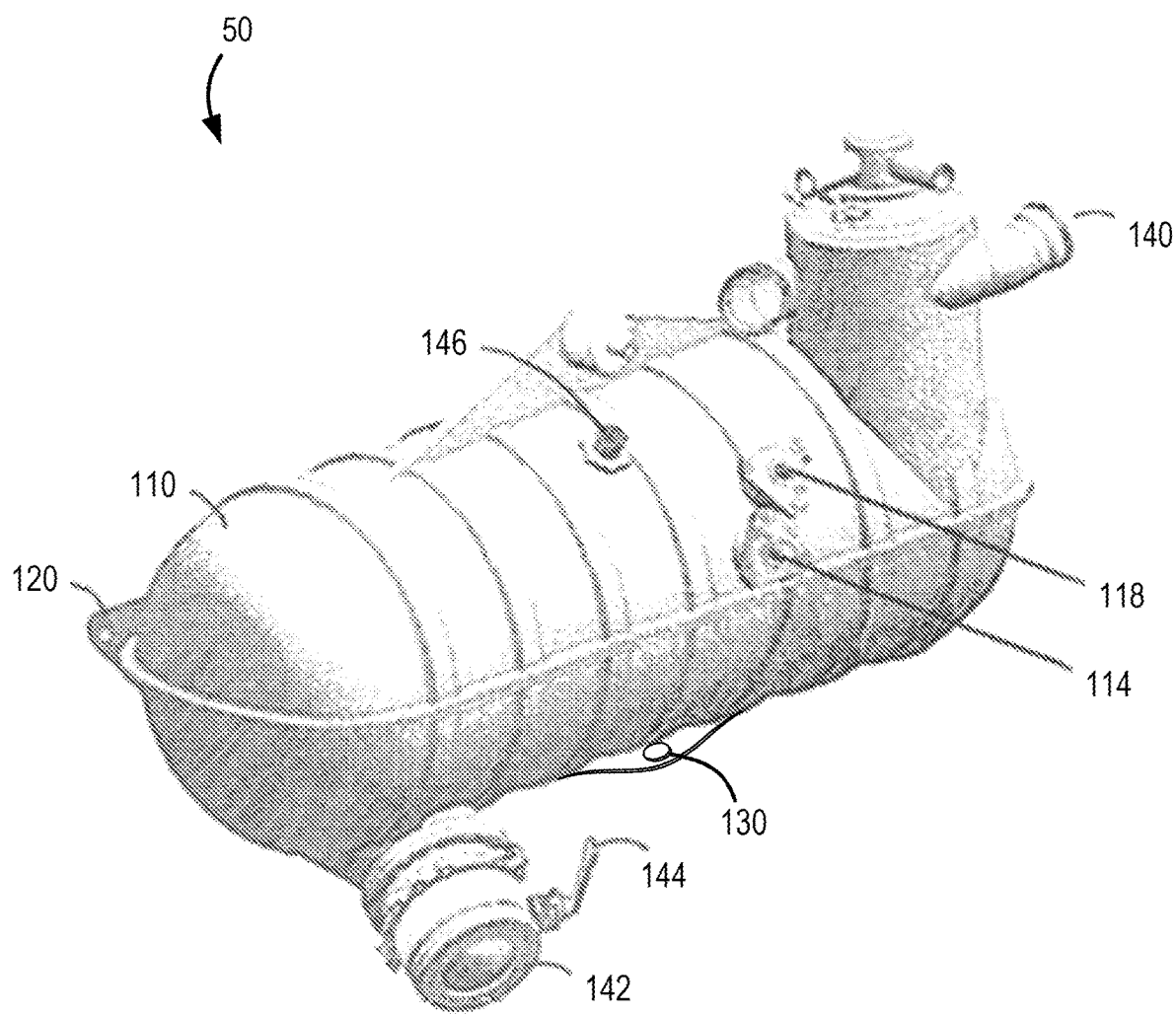
FIG. 2 illustrates a diagram of an overview of a continuous level sensing waste tank, in accordance with various embodiments.

Referring now to FIG. 2, a diagram of an overview of a continuous level sensing waste tank of the plumbing system 50 in accordance with various embodiments of the present disclosure is shown. An aircraft waste tank 110 (also referred to herein as a vacuum waste collection tank) may include a plurality of components. To couple with the host aircraft, a side attachment point 120 may operate as an attachment point. Side attachment point 120 may operate only as an attachment point, in accordance with various embodiments. A load cell 130 may be provided beneath the aircraft waste tank 110 for monitoring the real time weight of the waste tank 110. In various embodiments, load cell 130 functions both as a coupling with the host aircraft as well as a force sensor or strain gauge to measure a weight of the aircraft waste tank 110. An inlet 140, a rinse port 146, and tank drain 142 with associated drain valve 144 may function as fluid ports for the aircraft waste tank 110.

A lower point level sensor (PLS) 114 and an upper PLS 118 may be sited at various measuring points and configured to send a binary signal as the internal fluid physically reaches the individual PLS. In this manner the lower PLS 114 and the upper PLS 118 may output a signal indicative of a level of waste (e.g., sewage) within waste tank 110. The lower PLS 114 and/or the upper PLS 118 may be an ultrasonic PLS sensor configured to emit a high frequency pulse, generally in the 5 kHz to 200 kHz range in various embodiments, 20 kHz to 200 kHz range in various embodiments, and 40 kHz to 250 kHz range in various embodiments, and further configured to detect echo pulses in return. In various embodiments, the lower PLS 114 may be sited at 20% of full and the upper PLS 116 may be sited at 80% full. Selection of 20% and 80% of full may be adjusted to any suitable value. In various embodiments, the upper PLS 116 is situated above 50% and the lower PLS 114 is situated at or below 50%.

In various embodiments of the present disclosure, the aircraft waste tank 110 may function onboard and aircraft. However, contemplated herein, the inventive concepts described herein may apply to a waste tank on any moving vehicle which may include a waste tank and a flush apparatus.

Also, a plurality of sizes of aircraft waste tank 110 and PLS locations may function within the scope of the inventive concepts disclosed herein. The inventive concepts herein may directly apply to aircraft waste tanks of various sizes mounted on aircraft of various sizes.

Figure 3:
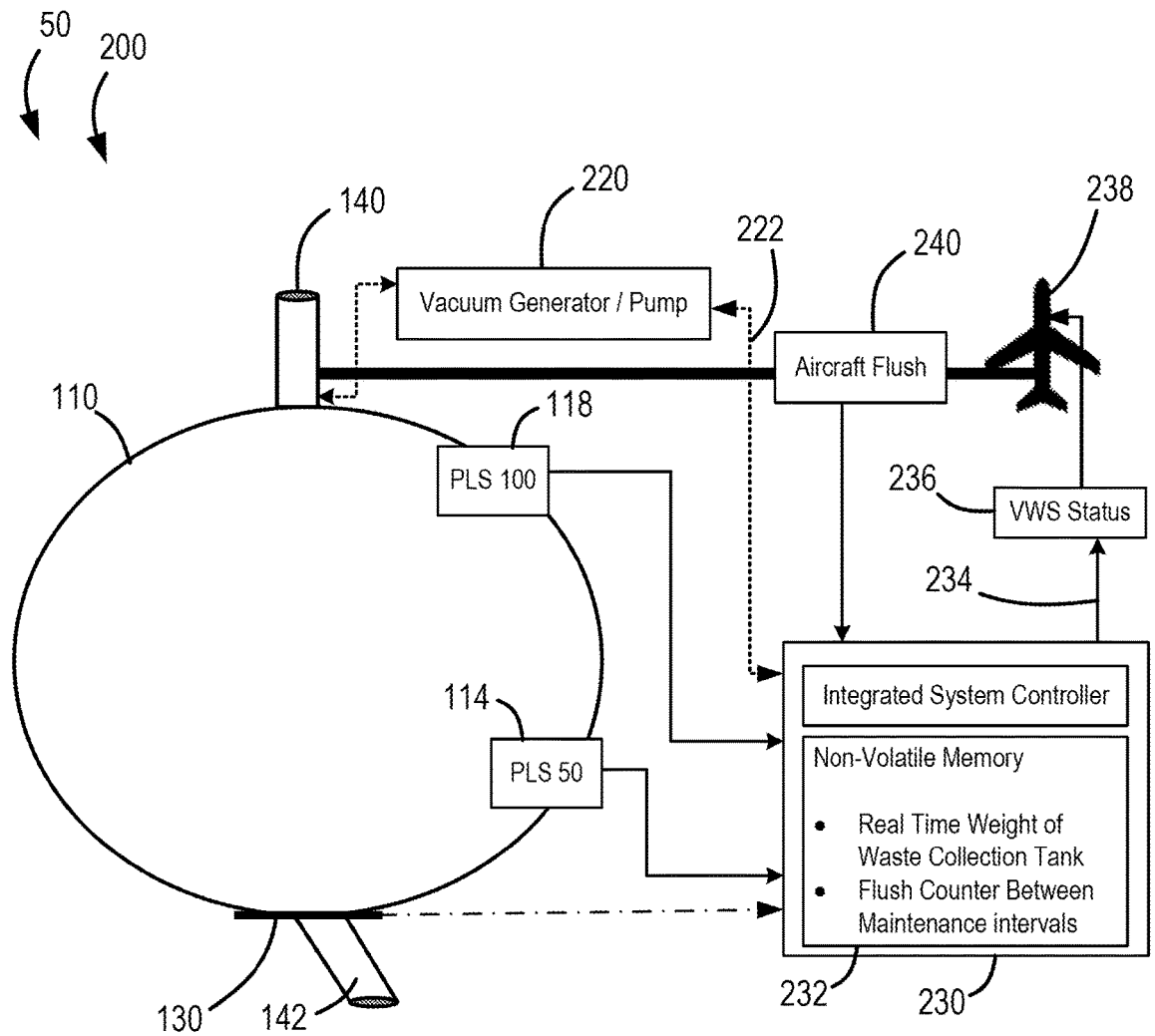
FIG. 3 illustrates a schematic diagram of a triple authentication waste level monitoring system, in accordance with various embodiments.

Referring now to FIG. 3, a diagram of plumbing system 50 comprising a triple authentication waste level monitoring system 200 for continuous waste level sensing of vacuum waste collection tank 110 in accordance with various embodiments of the present disclosure is shown. The system 200 includes the load cell 130 mechanically coupled with the host aircraft attachment as well as with the aircraft waste tank 110. Load cell 130 may be installed beneath the waste tank 110 and calibrated to measure the actual weight of the waste tank 110. In various embodiments, the load cell 130 may be embodied as a strain gauge and configured to measure the weight of the aircraft waste tank 110. The load cell 130 may operatively couple with the ISC 230. The load cell 130 may send a signal to ISC 230 indicative of the weight of waste tank 110. In this regard, load cell 130 may be in electronic communication with ISC 230.

To control function of the system 200, an integrated system controller (ISC) 230 having a processor operatively coupled with the ISC 230 may be employed. In various embodiments, ISC 230 may comprise a processor. In various embodiments, ISC 230 may be implemented in a single processor. In various embodiments, ISC 230 may be implemented as and may include one or more processors and/or one or more tangible, non-transitory memories (e.g., memory 232) and be capable of implementing logic. Each processor can be a general purpose processor, a digital signal processor (DSP), an application specific integrated circuit (ASIC), a field programable gate array (FPGA) or other programable logic device, discrete gate or transistor logic, discrete hardware components, or any combination thereof. ISC 230 may comprise a processor configured to implement various logical operations in response to execution of instructions (e.g., see flow chart in FIG. 4), for example, instructions stored on a non-transitory, tangible, computer-readable medium (e.g., memory 232) configured to communicate with ISC 230.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the ISC 230 may output a vacuum waste system (VWS) status 236 including current waste levels in the vacuum waste tank 110 to the host aircraft. The VWS status 236 may alert crew (e.g., via a display device 238 onboard the host aircraft) when waste tank 110 is full.

A communication network such as an ARINC 429 standard 234 may allow the ISC 230 to communicate in a standardized manner with the host aircraft. The ISC 230 may use the flush counter 240 input, the load cell 130 input, and the PLS 118 input to determine a waste tank level percentage and output this percentage to the host aircraft via VWS status 236.

System 200 may include a vacuum generator/pump 220 which may be in communication with ISC 230 via a controller area network (CAN) bus 222. Vacuum generator/pump 220 may be configured to apply vacuum to waste tank 110. By reducing pressure within waste tank 110, the pressure differential tends to assist waste in reaching waste tank 110 through the associated plumbing. The vacuum pressure in the waste tank 110 may be directly sensed and maintained at a predetermined amount. An altimeter or barometric pressure type instrument could also be used for operating the vacuum generator/pump 220. In various embodiments, a frequency of the CAN bus input from the load cell 130 may be between 1000 to 11000 Hz in various embodiments, between 400 to 11000 Hz in various embodiments, and between 400 to 4000 Hz in various embodiments.

To count each flush, the system 200 may employ a flush counter 240 mechanically coupled with an aircraft lavatory flush valve and operatively coupled with the ISC 230. Each flush from each onboard lavatory may increase the flush counter by one. In this regard, flush counter 240 keeps track of number of successful flushes since last maintenance/service of the waste tank 110. Flush counter 240 data may be stored in non-volatile memory 232 of ISC 230. In this regard, flush counter 240 is in electronic communication with ISC 230. Flush counter 240 data is reset to zero when waste tank 110 undergoes maintenance/service (i.e., when waste tank 110 is emptied).

With momentary combined reference to FIG. 1 and FIG. 3, the plumbing system 50 may comprise a rinse valve associated with each toilet 20. The rinse valve may be configured to open in response to external activation (e.g., via flushing of a handle, via a sensor detecting a person is no longer in front of the sensor, or the like). In response to opening the rinse valve, wastewater may flow from the toilet (e.g., toilet 20) to waste tank 110 (e.g., via inlet 140). In various embodiments, during the flushing process, potable water may be dispensed through a potable water port disposed in each toilet bowl (e.g., toilet 20). In this regard, any solid waste may be transported from the toilet 20 to the waste tank 110 as wastewater, in accordance with various embodiments.

Figure 4:
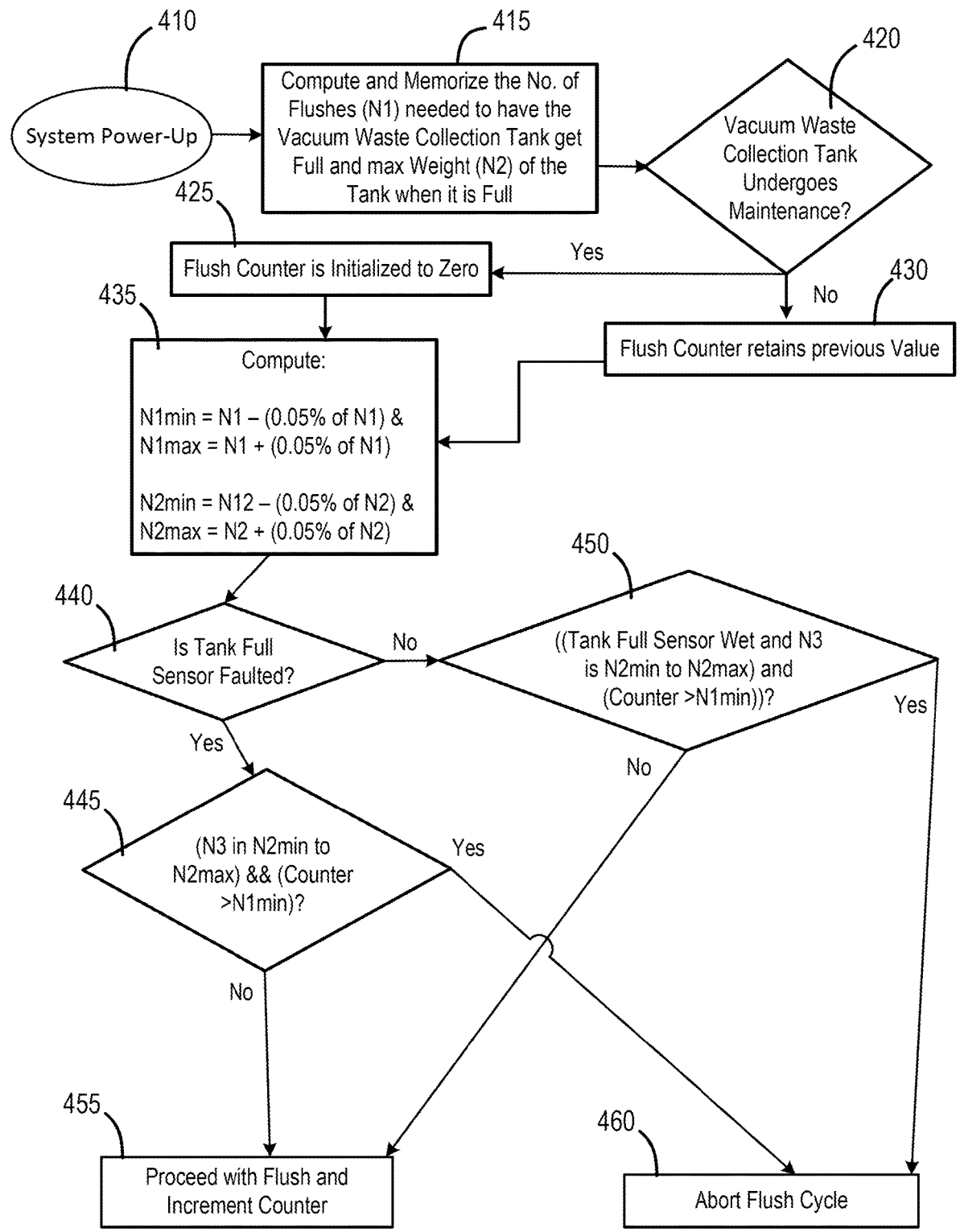
FIG. 4 illustrates a logic diagram of a method for monitoring a level of waste within a waste tank using triple authentication, in accordance with various embodiments.

Referring now to FIG. 4, a flow chart for control of system 200 is shown, in accordance with various embodiments. With combined reference to FIG. 3 and FIG. 4, ISC 230 employs a three step authentication model to determine usability of a lavatory utilizing flush counter 240 output, load cell 130 output, and PLS 114, 118 outputs. Upon start up (step 410), ISC 230 computes the number of successful flush cycles (N1) needed to reach the maximum capacity of the waste tank 110 (step 415). This number may be based on the total volume of the waste tank 110 and the maximum volume of the waste that can be pushed to the tank during a successful flush cycle. The number of successful flush cycles needed may be equal to the maximum volume of the waste tank 110 divided by the maximum volume of waste that goes into the waste tank during a successful flush cycle. ISC 230 may further define and store a maximum weight of the waste tank 110 (N2) when the waste tank 110 is full. Moreover, ISC 230 may monitor the weight of the waste tank 110 (N3).

At step 420, the ISC 230 may determine whether the waste tank 110 has undergone maintenance/service since the last flush cycle. When the aircraft operating mode is set to maintenance mode while the aircraft is on the ground and the service panel door of the waste tank is open and weight of the waste tank is equivalent to zero waste weight (empty waste tank), the ISC 230 may determine that the waste tank has undergone maintenance/service since the last flush cycle. If the waste tank 110 has undergone maintenance/service, the flush counter is reset to zero (step 425). If the waste tank 110 has not undergone maintenance/service, the flush counter retains its previous value (step 430).

At step 435, ISC 230 may compute a minimum number of flushes to fill the waste tank 110 (N1 min) (also referred to herein as a minimum flush threshold) by multiplying the number of successful flush cycles (N1) needed to reach the maximum capacity of the waste tank 110 with a tolerance or factor (e.g., of 0.05%) and subtracting that product from the number of successful flush cycles (N1) needed to reach the maximum capacity of the waste tank 110, as provided in equation 1 below:

$$N1\ min = N1 - (0.05\%\ of\ N1) \qquad \text{Eq. 1}$$

ISC 230 may further compute a maximum number of flushes to fill the waste tank 110 (N1 max) (also referred to herein as a maximum flush threshold) by multiplying the number of successful flush cycles (N1) needed to reach the maximum capacity of the waste tank 110 with a tolerance or factor (e.g., of 0.05%) and adding that product to the number of successful flush cycles (N1) needed to reach the maximum capacity of the waste tank 110, as provided in equation 2 below:

$$N1\ max = N1 + (0.05\%\ of\ N1) \qquad \text{Eq. 2}$$

In this manner, since N1 indicates an average number of flushes to fill the tank, the ISC 230 shall apply a predetermined tolerance, such as 0.05%, to indicate a range of possible flushes at which the waste tank 110 may be filled.

At step 435, ISC 230 may further compute a minimum weight at which waste tank 110 may be full (N2 min) (also referred to herein as a minimum weight threshold) by multiplying the average weight of a full waste tank 110 (N2) with a tolerance or factor (e.g., of 0.05%) and subtracting that product from the average weight of a full waste tank 110 (N2), as provided in equation 3 below:

$$N2\ min = N2 - (0.05\%\ of\ N2) \qquad \text{Eq. 3}$$

ISC 230 may further compute a maximum weight at which waste tank 110 may be full (N2 max) (also referred to herein as a maximum weight threshold) by multiplying the average weight of a full waste tank 110 (N2) with a tolerance or factor (e.g., of 0.05%) and adding that product to the average weight of a full waste tank 110 (N2), as provided in equation 4 below:

$$N2\ max = N2 + (0.05\%\ of\ N2) \qquad \text{Eq. 4}$$

In this manner, since N2 indicates an average weight of the waste tank 110 at which the waste tank is at capacity or filled, the ISC 230 shall apply a predetermined tolerance, such as 0.05%, to indicate a range of possible weights at which the waste tank 110 may be at capacity.

At step 440, ISC may determine if the tank full sensor is faulted. In this regard, ISC 230 may monitor the health status of the PLS which indicates the waste tank 110 is 100% full (e.g., upper PLS 118). ISC 230 may determine that upper PLS 118 is faulty by validating the discrete input from the PLS which indicates the state (Healthy/Faulty) of the PLS.

If the health status of the upper PLS 118 is faulted, ISC 230 moves to step 445 to determine if both N3 is between N2 min and N2 max and the flush counter 240 is greater than N1 min. In response to one or both of these determinations being false, ISC 230 may proceed with the flush cycle (i.e., accept further waste into the waste tank 110) and increment the counter (step 455). Stated differently, in response to one or both of these determinations being false, ISC 230 may determine that the waste tank 110 is not full and continue normal operation of waste tank 110 until it is determined that the waste tank 110 is full. In contrast, in response to both of these determinations being true, ISC 230 may abort the flush cycle (step 460) and send an indication signal to a display device 238 onboard the host aircraft indicating that the waste tank 110 is full. Stated differently, in response to detecting that the upper PLS 118 is faulty, ISC 230 may detect that the waste tank 110 is full only if both the weight of the waste tank 110 (N3) as monitored by load cell 130 is between the minimum weight at which waste tank 110 may be full (N2 min) and the maximum weight at which waste tank 110 may be full (N2 max) and the flush counter 240 is greater than computed minimum number of flushes required to fill the waste tank 110 (N1 min). In this manner, ISC 230 may evaluate if the waste tank 110 is full by comparing the flush counter 240 value against N1 min and N1 max as well as by comparing the N3 value against N2 min and N2 max. The flush cycle will be aborted only when N3 is in Range of N2 min to N2 max and the flush counter 240 is greater than N1 min.

If the health status of the upper PLS 118 is not faulted (i.e., step 440, NO), ISC 230 moves to step 450 to determine if the upper PLS 118 is wet (i.e., upper PLS 118 indicates that the waste has reached upper PLS 118 for a predetermined duration thereby indicating the waste tank 110 is full). Stated differently, at step 450 ISC 230 determines if the upper PLS 118 is indicating a tank full status. The flush cycle will be aborted only when all three sensors (i.e., upper PLS 118, load cell 130, and flush counter 240) indicate a full waste tank 110. Stated differently, ISC 230 determines if upper PLS 118 is indicating a tank full status, N3 is between N2 min and N2 max, and the flush counter 240 is greater than N1 min. In response to one or more of these determinations being false, ISC 230 may determine that the waste tank 110 is not full (step 455) and continue normal operation of waste tank 110 until it is determined that the waste tank 110 is full. In contrast, in response to all three of these determinations being true, ISC 230 may abort the flush cycle (step 460) and send an indication signal to the host aircraft indicating that the waste tank 110 is full. Stated differently, in response to detecting that the upper PLS 118 is not faulty, ISC 230 may detect that the waste tank 110 is full only if the upper PLS 118 indicates a wet condition (i.e., is indicating a tank full status), the weight of the waste tank 110 (N3) as monitored by load cell 130 is between the minimum weight at which waste tank 110 may be full (N2 min) and the maximum weight at which waste tank 110 may be full (N2 max), and the flush counter 240 is greater than computed minimum number of flushes required to fill the waste tank 110 (N1 min).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A waste level monitoring system for an aircraft waste tank, comprising:
   a point level sensor disposed on the aircraft waste tank;
   a load cell disposed on the aircraft waste tank;
   a flush counter configured to count a number of toilet flushes since a previous service to the aircraft waste tank; and
   a controller electronically coupled to the point level sensor, the load cell, and the flush counter, the controller configured to:
   receive, via the point level sensor, a first signal indicating a level of waste within the aircraft waste tank;
   receive, via the load cell, a second signal indicating a weight of the aircraft waste tank;
   receive, via the flush counter, a third signal indicating the number of toilet flushes since the previous service to the aircraft waste tank;
   determine whether the point level sensor is faulted;
   in response to the point level sensor being faulted, determine whether:
   (a) the weight of the aircraft waste tank is between a minimum weight threshold and a maximum weight threshold; and
   (b) the number of toilet flushes is greater than a minimum flush threshold; and in response to both (a) and (b) being true, send a waste system status signal to a display device onboard an aircraft indicating that the aircraft waste tank is full; and in response to the point level sensor not being faulted, the controller is configured to determine whether:
(a) the weight of the aircraft waste tank is between the minimum weight threshold and the maximum weight threshold;
(b) the number of toilet flushes is greater than the minimum flush threshold; and
(c) the first signal indicates that the aircraft waste tank is full; and in response to (a), (b), and (c) being true, send the waste system status signal to the display device onboard the aircraft indicating that the aircraft waste tank is full.

2. The waste level monitoring system of claim 1, wherein, in response to at least one of (a) or (b) being false, the controller is configured to proceed with a flush cycle and increment the number of toilet flushes.

3. The waste level monitoring system of claim 1, wherein, in response to at least one of (a), (b), or (c) being false, the controller is configured to proceed with a flush cycle and increment the number of toilet flushes.

4. The waste level monitoring system of claim 1, further comprising the display device.

5. The waste level monitoring system of claim 1, wherein the point level sensor is an ultrasonic point level sensor.

6. A method for monitoring a level of waste within a waste tank, the method comprising:
receiving, by a controller, a first signal from a point level sensor indicating the level of waste within the waste tank;
receiving, by the controller, a second signal from a load cell indicating a weight of the aircraft waste tank;
receiving, by the controller, a third signal from a flush counter indicating a number of toilet flushes since a previous service to the aircraft waste tank;
determining, by the controller, whether the point level sensor is faulted;
in response to determining that the point level sensor is faulted, determining, by the controller, whether:
(a) the weight of the aircraft waste tank is between a minimum weight threshold and a maximum weight threshold; and
(b) the number of toilet flushes is greater than a minimum flush threshold; and
in response to both (a) and (b) being true, sending, by the controller, a waste system status signal to a display device onboard an aircraft indicating that the aircraft waste tank is full and
in response to the point level sensor not being faulted, determining, by the controller, whether:
(a) the weight of the aircraft waste tank is between the minimum weight threshold and the maximum weight threshold;
(b) the number of toilet flushes is greater than the minimum flush threshold; and
(c) the first signal indicates that the aircraft waste tank is full; and
in response to (a), (b), and (c) being true, sending, by the controller, the waste system status signal to the display device onboard the aircraft indicating that the aircraft waste tank is full.

7. The method of claim 6, wherein, in response to at least one of (a) or (b) being false, the controller is configured to proceed with a flush cycle and increment the number of toilet flushes.

8. The method of claim 6, wherein, in response to at least one of (a), (b), or (c) being false, the controller is configured to proceed with a flush cycle and increment the number of toilet flushes.

9. The method of claim 6, further comprising computing, by the controller, a number of successful flush cycles needed to reach the maximum capacity of the waste tank.

10. The method of claim 6, further comprising:
determining, by the controller, whether the waste tank has undergone maintenance; and
in response to the waste tank having undergone maintenance, resetting, by the controller, the number of toilet flushes since the previous service to the aircraft waste tank to zero.

11. The method of claim 6, further comprising computing, by the controller, at least one of the minimum weight threshold, the maximum weight threshold, and the minimum flush threshold.

12. The method of claim 6, wherein determining whether the point level sensor is faulted includes validation of a discrete input received from the point level sensor which indicates the state of the point level sensor.

13. An aircraft, comprising:
a toilet disposed in a lavatory;
a waste tank;
a fluid conduit extending from the toilet to the waste tank;
a point level sensor disposed in the waste tank, the point level sensor configured to measure a wastewater level within the waste tank;
a load cell coupled to the aircraft waste tank;
a flush counter configured to count a number of toilet flushes since a previous service to the waste tank; and
a controller electronically coupled to the point level sensor, the load cell, and the flush counter, the controller configured to:
receive, via the point level sensor, a first signal indicating a level of waste within the waste tank;
receive, via the load cell, a second signal indicating a weight of the aircraft waste tank;
receive, via the flush counter, a third signal indicating the number of toilet flushes since the previous service to the aircraft waste tank;
determine whether the point level sensor is faulted;
in response to the point level sensor being faulted, determine whether:
(a) the weight of the aircraft waste tank is between a minimum weight threshold and a maximum weight threshold; and
(b) the number of toilet flushes is greater than a minimum flush threshold; and
in response to both (a) and (b) being true, send a waste system status signal to a display device onboard an aircraft indicating that the aircraft waste tank is full; and
in response to the point level sensor not being faulted, the controller is configured to determine whether:
(a) the weight of the aircraft waste tank is between the minimum weight threshold and the maximum weight threshold;
(b) the number of toilet flushes is greater than the minimum flush threshold; and
(c) the first signal indicates that the aircraft waste tank is full; and in response to (a), (b), and (c) being true, send the waste system status signal to the display device onboard the aircraft indicating that the aircraft waste tank is full.

14. The waste level monitoring system of claim 13, wherein, in response to at least one of (a) or (b) being false, the controller is configured to proceed with a flush cycle and increment the number of toilet flushes.

15. The waste level monitoring system of claim 13, wherein, in response to at least one of (a), (b), or (c) being false, the controller is configured to proceed with a flush cycle and increment the number of toilet flushes.

16. The waste level monitoring system of claim 13, further comprising the display device.

17. The waste level monitoring system of claim 13, wherein the point level sensor is an ultrasonic point level sensor.

\* \* \* \* \*

UNITED STATES PATENT AND TRADEMARK OFFICE
CERTIFICATE OF CORRECTION

| | | |
|---|---|---|
| PATENT NO. | : 11,959,791 B2 | |
| APPLICATION NO. | : 17/857767 | |
| DATED | : April 16, 2024 | |
| INVENTOR(S) | : Maanas Kumar Kotha et al. | |

It is certified that error appears in the above-identified patent and that said Letters Patent is hereby corrected as shown below:

In the Claims

Claim 6, at Column 11 Line 52 please insert --;-- after the word "full"

Signed and Sealed this
Sixth Day of August, 2024

Katherine Kelly Vidal
*Director of the United States Patent and Trademark Office*